May 4, 1926.

Re. 16,339

L. G. DANIELS

SAFETY VALVE FOR OIL BURNERS AND THE LIKE

Original Filed Jan. 17, 1922

Inventor:
Lee G. Daniels
By Wilson & McCanna
Attys.

Reissued May 4, 1926.

Re. 16,339

UNITED STATES PATENT OFFICE.

LEE G. DANIELS, OF ROCKFORD, ILLINOIS.

SAFETY VALVE FOR OIL BURNERS AND THE LIKE.

Original No. 1,524,914, dated February 3, 1925, Serial No. 529,823, filed January 17, 1922. Application for reissue filed November 13, 1925. Serial No. 68,923.

*To all whom it may concern:*

Be it known that I, LEE G. DANIELS, a citizen of the United States, residing at Rockford, in the county of Winnebago and State of Illinois, have invented certain new and useful Improvements in Safety Valves for Oil Burners and the like, of which the following is a specification.

This invention pertaining in general to valves, has more particular reference to safety valves especially adapted for use in connection with oil or other liquid fuel burners. These burners are extensively used in domestic furnaces and heaters, and in the event that the flame is accidentally extinguished and gravity or other constant flow feed is employed, the fuel will overflow. This overflow is exceedingly dangerous by reason of the combustible nature of the liquid fuel, and in any event will cause property damage.

The primary object of the present invention is to provide a simple and novel valve device which will positively shut off the fuel supply if the flame in the burner is extinguished, and to this end, I utilize the overflow in the burner for initiating the shut-off action.

My invention contemplates the provision of a valve which will operate with absolute certainty and will be dependable under all conditions and will not be affected by changes in temperature or humidity, or by the surroundings in any particular place or use, which by reason of dampness, etc., impair and sometimes render inoperative prior devices provided for the purpose of shutting off the fuel supply under the conditions mentioned.

Another object is to provide a safety valve of the character described embodying but few parts constructed in a simple manner so as to be capable of production at a small cost, and which function in a novel manner, insuring certainty of operation, as will be explained more fully hereinafter.

Other objects and attendant advantages will be appreciated by those familiar with this art as the invention becomes better understood by reference to the following description when considered in connection with the accompanying drawings, in which—

Figure 1:
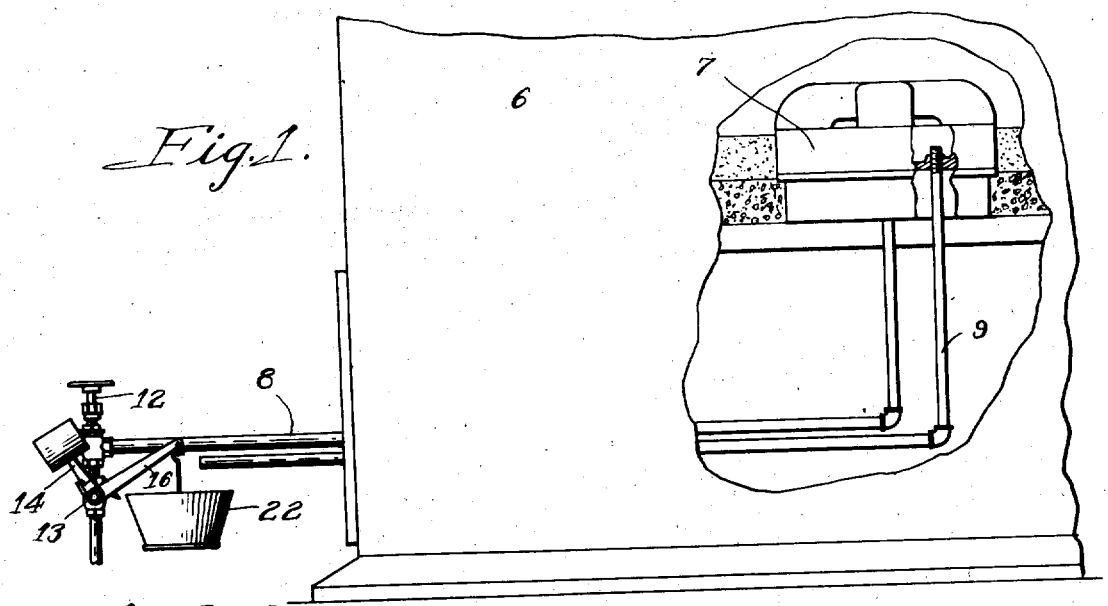
Figure 2:
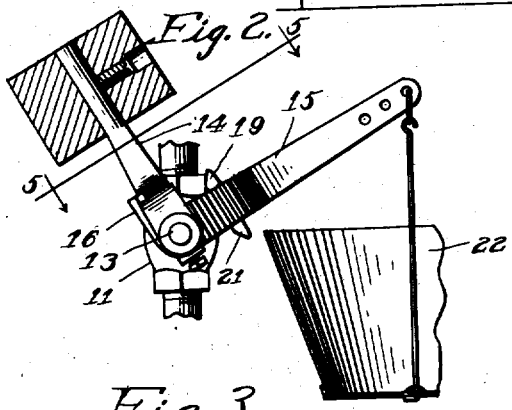
Figure 4:
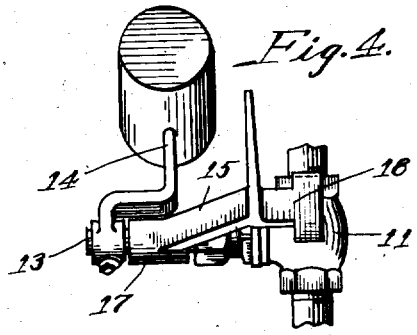
Figure 3:
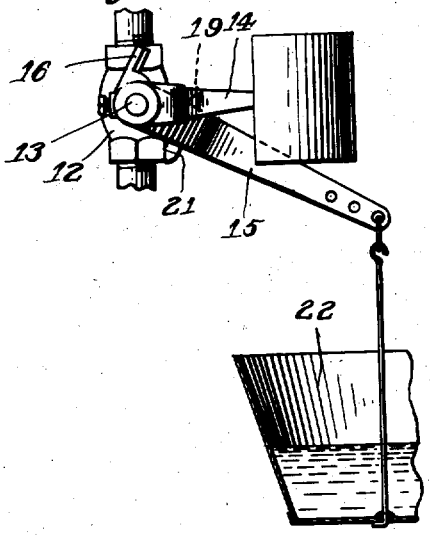
Figure 5:
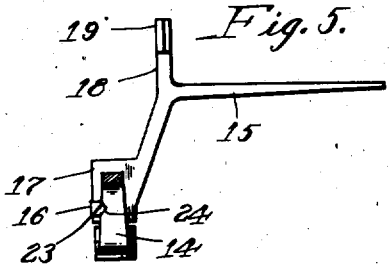

Figure 1 is a side elevation, partly in section, of an oil burning heater or furnace equipped with a safety valve embodying my invention;

Fig. 2, an enlarged view of the safety valve in the normal set position with the valve open;

Fig. 3, a similar view with the parts tripped to the closed position;

Fig. 4, a view of the safety valve looking at the right hand side of Fig. 2, with the bucket removed; and Fig. 5, a detail section taken substantially on the line 5—5 of Fig. 2.

In illustrating the use of my invention, I have shown merely in outline, a heater or furnace 6, equipped with an oil burner 7, to which is connected a fuel supply pipe 8 and an overflow pipe 9. The primary object of the present invention is to utilize the overflow through the pipe 9 (in the event that the burner flame is extinguished) to automatically shut off the fuel supply.

In the fuel supply line there is mounted in any suitable manner, a shut-off valve and means for regulating the flow or feed of the fuel. In the present illustration, I employ a shut-off valve 11 and a regulating valve 12, each of which may be of any suitable or preferred construction, it being observed that the manner of regulating or adjusting the feed is immaterial to the present invention. The shut-off valve shown, is of the globe needle valve type, including a valve stem 13, which when given a partial rotative movement in opposite directions, closes and opens the valve passage. This valve is normally held open by means of a weighted arm 14, fixed to the valve stem 13 and held as shown in Fig. 2, at one side of the vertical plane or center of the valve stem, by means of an intermediate stop and trip device, which will now be described.

This device consists of integrally formed lever arms 15 and 16, a hub 17 and an extension 18 from the arm 15 provided with stops 19 and 21 adapted to abut against the casing of the valve 11. To the outer end of the lever arm 15 is suspended a bucket or any suitable receptacle 22. The lever arm 16 has a V-shaped forward edge 23 adapted to engage in a complemental face 24 in the arm 14, as shown plainly in Fig. 5. The purpose of these V-shaped faces is to maintain the bucket-carrying member or lever in a predetermined relation to the weighted arm and to hold the collar 17 of said bucket member against lengthwise displacement on the stem 13, thereby to prevent any binding or frictional contact between the ends of said collar and the faces of adjoining parts on the valve stem.

The parts described are so shaped and relatively arranged that the weighted arm will be held in the normal open position shown in Fig. 2 by reason of contact between the faces 23 and 24 and between the stop 19 and the valve case. This position is maintained by reason of the center of gravity of the weighted arm being disposed at a given side of the vertical plane or center of the valve stem. The parts are, therefore, in a set position with the valve open, the flow or feed being regulated by the valve 12. Assuming now that the flame in the burner is extinguished, the oil will overflow in the burner 7 and pass through the pipe 9 into the bucket 22. When the bucket is sufficiently filled, it will overbalance the weighted arm and drop to the position shown in Fig. 3, limited by the stop 21. This movement, however, of the arm 15 is not in itself utilized to shut off the needle valve. It merely initiates the shut-off movement in that it throws the weighted arm past the center of the needle valve and permits said weighted arm to freely gravitate. The weighted arm thus gains momentum and its greatest force is exerted in the act of finally closing the valve, as distinguished from a direct spring action in which the greatest pressure is exerted during the initial spring movement. Consequently, in the present case the arm 15 may be stopped at any time after it has swung the weighted arm substantially past said center, and said weighted arm will fall with increasing force so as to positively shut off the valve. The valve-closing movement may vary more or less according to the design and proportions of the particular valve, and in the present instance the trip moves through an arc of approximately 60 degrees, while that of the weighted arm is approximately 120 degrees. In this example, the valve is completely closed when the weighted arm reaches substantially the horizontal plane of the valve stem. However, if a greater number of degrees should be required for completely closing the valve, there is available approximately 90 degrees in addition to the closing movement employed in the present example. After the device has been tripped and the valve closed, it may be opened again simply by swinging the weighted arm to the set position and emptying the bucket as will be obvious. It will be observed that no springs are employed in the construction and that the function of the parts will not be impaired by reason of changes in temperature or humidity, or under severe conditions such as the presence of heavy dampness, which invariably is inimical to positive operation of other devices by reason of the more or less delicate parts becoming rusted and failing to function at the critical time. It will also be observed that this construction allows of a maximum valve opening equal substantially to the maximum opening of the hand adjustment valve 12.

It is believed that the foregoing conveys a clear understanding of the objects prefaced above, and while I have illustrated but a single working embodiment, it should be understood that considerable change might be made in details of construction without departing from the spirit and scope of the invention as expressed in the appended claims, in which—

I claim:

1. In a liquid fuel supply, the combination of a valve having a horizontally disposed oscillatory valve stem, an arm fixed to said stem and equipped at its outer end with a weight, a receptacle adapted to be filled by overflow of the liquid fuel, a lever loose on the valve stem and carrying at its outer end said receptacle, stops for limiting oscillation of said lever in opposite directions, and means actuated by said lever for tilting said weight-equipped arm from a valve opened position to a valve closing position, said weight-equipped arm having a closing movement under the action of the weight subsequent to the closing movement of the receptacle lever.

2. In a liquid fuel supply, the combination of a valve having a horizontally disposed oscillatory valve stem, an arm fixed to said valve stem and equipped at its outer end with a weight, a receptacle adapted to be filled by overflow of the liquid fuel, a lever loose on the valve stem and carrying at its outer end said receptacle, stops on said lever for limiting its oscillation in opposite directions, and means actuated by said lever for tilting said weight-equipped arm from a valve opened position to a valve closing position, said means permitting the weight-equipped arm to move in a valve closing direction a greater number of degrees than said lever in the valve closing movement.

3. The combination of a valve having a valve stem adapted by rotative movement to open and close the valve, a weight fixed to said valve stem and normally disposed above and at one side of the center thereof in an open position, an arm loose on the valve stem and having stops for limiting oscillation in both directions and so co-operating with said weight that at one limit it maintains the latter in said open position, and a receptacle suspended from the outer end of said arm adapted by filling to throw said weight beyond said center, whereby to close the valve by the fall of said weight.

4. The combination of a valve having a valve stem adapted by rotative movement to open and close the valve, a weight fixed to said valve stem and normally disposed above and at one side of the center thereof in an open position, an arm loose on the valve stem and having stops for limiting oscillation in both directions and so co-operating with said weight that at one limit it maintains the latter in said open position, and a receptacle suspended from the outer end of said arm adapted by filling to throw said weight beyond said center, whereby to close the valve by the fall of said weight, the valve-closing movement of said arm being limited by another of its stops without interfering with continued fall of the weight which fall completes closing of the valve.

5. The combination of a valve having a horizontally disposed oscillatory valve stem, a weight eccentrically fixed to said valve stem and adapted when thrown to different sides of a center to hold the valve in opened and closed positions, a lever loose on the valve stem and having a receptacle-carrying arm and a weight-actuating part and stops for limiting oscillation of the lever in opposite directions, and a receptacle carried by the first mentioned arm, the arrangement being such that when said receptacle is filled to a predetermined degree the lever will be oscillated by the weight of the receptacle contents for tilting the weight beyond said center position, permitting it to drop to a valve closing position.

6. In a liquid fuel supply, the combination of a valve having an oscillatory valve stem, a lever loose on said valve stem and equipped at its outer end with a receptacle adapted to receive overflow of the liquid fuel and to fall a limited distance under its weight, a second lever fixed to said valve stem and equipped with a weight adapted for closing the valve, means whereby the receptacle lever will initially move the weight lever in a valve-closing direction, and means whereby the weight lever will have a valve-closing movement under the momentum of its weight subsequent to fall of said receptacle.

7. In a liquid fuel supply, the combination of a valve having an oscillatory valve stem, a lever loose on said valve stem and equipped at its outer end with a receptacle adapted to receive overflow of the liquid fuel, a second lever fixed to said valve stem and equipped with a weight adapted for closing the valve, and means whereby the receptacle lever will move the weight lever in a valve-closing direction and whereby the weight lever has a valve-closing movement subsequent to the closing movement of the receptacle lever.

8. In a liquid fuel supply, the combination of a fuel supply line, a shut-off valve in said line having a valve closing member, a weighted arm mounted to swing on a fulcrum coaxial with said valve member and arranged for imparting axial movement thereto for shutting off the fuel supply by fall of the weight, means adapted to be actuated by overflow fuel for setting off a trip device, a trip device operative between said weighted arm and said means to normally retain the weighted arm in a set position with the shut-off valve open and adapted to be actuated by said means to release the weighted arm from its said set position and allow it to fall and shut off the fuel supply, and means whereby after the overflow fuel has been removed from said fuel-actuated means the weighted arm may be returned to said set position and will by such return movement automatically reposition said fuel-actuated means and cause the said trip device to be set in conjunction with the weighted arm for retaining the latter in its said set position.

9. In a fuel burning system, in combination, a burner, a fuel supply line to the burner, an overflow or excess feed return pipe from the burner, a valve in the fuel supply line having a valve member adapted to be closed by the action of a screw-thread connection, a weighted member adapted to be normally held in a set position and to be released from said position by flow of fuel from said return pipe and being so connected with said valve as to seat its valve member by a closing movement increasing in pressure with the fall of the weight, and means having a releasable connection with said weighted member and adapted to be actuated by fuel from said return pipe for releasing said weighted member from its said set position, said means being adapted to be automatically reset by movement of the weighted member to its said set position.

10. A safety valve for oil burners comprising, in combination, a valve proper having a valve-closing member, means for seating said member by action of a screw-thread connection, a weighted member mounted to swing in a fixed arc about a center coaxial with said screw-thread connection and adapted to shut off the valve by falling, means adapted to be actuated by overflow fuel for setting off a trip device, and a trip device operative between said weighted member and said means to normally retain the weighted member in a set position with the valve open and adapted to be actuated by said means to release the weighted member from its said set position and allow it to fall and shut off the valve, said trip device being adapted to be reset by the act of returning the weighted member to its normal set position.

11. A shut off valve for oil burners comprising, in combination, a valve proper having a valve-closing member adapted to be closed by the action of a screw-thread connection, a weighted member normally in a set position and adapted to be released therefrom to operate said screw-thread connection and close said valve by a falling action, means adapted to be actuated by overflow fuel, and a trip device operative between said means and weighted member for retaining the latter in said set position and adapted to be actuated by said overflow fuel to release said weighted member so that it may function to shut off the valve, said trip device being subsequently actuated by the act of returning the weighted member to its said set position to thereby reset and retain the weighted member in said set position.

12. A shut off valve for oil burners comprising, in combination, a valve proper having a valve-closing member, a weighted member pivoted to swing in a fixed arc and adapted by falling to impart closing movement to said valve member, a trip device for normally retaining the weighted member in a set position and adapted to be actuated to release it from said set position so that it may fall and shut off the valve, and means adapted to be actuated by overflow oil for setting off the trip device, said trip device and weighted member being so cooperatively associated that by the act of swinging the weighted member to its said set position the trip device will be actuated by said weighted member to reset and retain it in the said set position.

13. A shut off valve for oil burners comprising, in combination, a valve proper having a valve-closing member, a weighted member pivoted to swing in a fixed arc and adapted by falling to impart closing movement to said valve member, a pivoted trip lever, means connected to one arm of said lever and adapted to be actuated by overflow oil to initiate valve-closing movement of said weighted member, the weighted member being movable into and out of contact with another arm of said lever and adapted to be normally retained thereby in a set position with the valve open and to be released therefrom by operation of said overflow oil on said means to shut off the valve, the weighted member functioning independently of said trip lever after release therefrom, said trip lever being so positioned with its second mentioned member in the path of said weighted member that the latter will be brought into contact with the former when returning to its normal set position and will retain the weighted member in said set position.

LEE G. DANIELS.